United States Patent
Naito

[11] Patent Number: 5,619,595
[45] Date of Patent: Apr. 8, 1997

[54] APPARATUS FOR DETECTING MOTION VECTOR INCLUDED IN IMAGE INFORMATION

[75] Inventor: Joji Naito, Tokyo-to, Japan

[73] Assignee: Victor Company of Japan, Ltd., Yokohama, Japan

[21] Appl. No.: 52,920

[22] Filed: Apr. 27, 1993

[30] Foreign Application Priority Data

Apr. 28, 1992 [JP] Japan .................................. 4-136003

[51] Int. Cl.⁶ ........................................................ G06K 9/36
[52] U.S. Cl. ............................................. 382/236; 348/407
[58] Field of Search ................................. 382/42, 44, 45,
382/48, 107, 276, 236; 358/135, 136, 105,
140, 214; 395/152; 340/716; 348/407, 412, 413

[56] References Cited

U.S. PATENT DOCUMENTS

| | | | |
|---|---|---|---|
| 4,307,420 | 12/1981 | Ninomiya et al. | 358/136 |
| 4,562,468 | 12/1985 | Koga | 358/136 |
| 4,816,906 | 3/1989 | Kummerfeldt et al. | 358/136 |
| 4,951,140 | 8/1990 | Ueno et al. | 348/413 |
| 4,985,768 | 1/1991 | Sugiyama | 358/136 |
| 5,103,307 | 4/1992 | Sugiyama | 358/136 |
| 5,105,271 | 4/1992 | Niihara | 358/133 |
| 5,115,229 | 5/1992 | Shalit | 340/716 |
| 5,117,287 | 5/1992 | Koike et al. | 358/133 |
| 5,128,756 | 7/1992 | Johnston et al. | 358/133 |
| 5,150,432 | 9/1992 | Ueno et al. | 382/56 |
| 5,181,111 | 1/1993 | Hedley et al. | 358/140 |

OTHER PUBLICATIONS

SGS–Thomson Microelectronics, May 16, 1989, STV322, Motion Estimation Processor.
ISO–DIS–11172–2, D–31–D36.

*Primary Examiner*—Yon J. Couso
*Attorney, Agent, or Firm*—Jacobson, Price, Holman & Stern, PLLC

[57] ABSTRACT

A motion vector detection method detects a motion vector of an input image by using two image information which are different each other in time base. The method comprises a step of correcting at least one of the two image information on the basis of two image data constituting two image information, respectively, and a step of detecting a motion vector from a displacement between corrected image data and the other image data.

2 Claims, 3 Drawing Sheets

APPARATUS FOR DETECTING MOTION VECTOR INCLUDED IN IMAGE INFORMATION

BACKGROUND OF THE INVENTION

The present invention relates to a method of detecting a motion vector, suitable for use, and in a motion compensation interframe predictive coding apparatus.

In the field of coding image information, a technique called "motion compensation interframe predictive coding" is known in which an image displacement between a previous frame image and a present frame image is detected as a motion vector, and there is coded a difference between the present frame image and a predicted image which is obtained from the previous image on the basis of the motion vector. In this case, it is the procedure to divide one frame image into a plurality of blocks having for example "8×8" pixels or "16×16" pixels, and motion vector detection and coding processing are performed for each block.

FIG. 1 is a block diagram showing an example of a conventional motion compensation interframe predictive coding apparatus.

In FIG. 1, an input image memory 1 stores input image data of the present frame. A decoded image memory 3 stores image data of the previous frame which is reproduced by decoding coded image data generated by coding image data of the previous frame. The image data corresponds to quantized image data of one frame such as "L×M" pixels.

A motion compensation circuit 2 detects as a motion vector an image displacement between input image data $D_a$ and decoded image data $D_b$, namely, the present frame and the previous frame, in each block and composes predictive image data $D_c$ which are compensated by its motion corresponding to the input image data by using the motion vector and the decoded image data $D_b$, so as to output the predictive image data $D_c$ to a subtracter 4.

In the subtracter 4, the predictive image data $D_c$ are subtracted from the input image data $D_a$ to generate predictive error data $D_d$ which are coded (quantized) by an encoding circuit 5 to provide coded image data $D_g$. The coded image data $D_g$ are transmitted or recorded together with the motion vector obtained previously.

At the same time, coded image data $D_e$ which are the same data as DE, are decoded by a decoding circuit 6 to supply to an adder 7. The adder 7 adds decoded data $D_f$ with the predictive image data $D_c$ to reproduce decoded image data $D_b$ which are supplied to and stored in the decoded image memory 3. Accordingly, when the motion detection and coding are completed with respect to entire blocks in the present frame, the decoding image memory 3 stores the present frame image data of "L×M" pixels, which will be used in coding processing in the next frame.

FIG. 2 is a block diagram showing a conventional decoding apparatus for decoding the coded image data which are encoded by the apparatus shown in FIG. 1.

In FIG. 2, a decoding circuit 11 decodes the coded image data $D_g$ which are transmitted from the coding apparatus or read out from a recording medium, so as to supply to an adder 12.

Image data $D'_h$ of "L×M" pixels, which are image information in the previous frame stored in the decoded image memory 13, are output as the decoded and reproduced image data and supplied to a motion compensation circuit 14. The motion compensation circuit 14 performs motion compensation to the image data $D'_h$ of the previous frame by the motion vector which is transmitted together with the coded image data $D_g$ to compose predictive image data $D_i$ corresponding to the present frame image. The predictive image data $D_i$ is added to an output from the decoding circuit 11 by the adder 12, so as to reproduce decoded image data $D_h$ of the present frame, which are store in the decoded image memory 13.

The above-described processing is performed by a block unit as the same as the coding processing, and when processing of all the blocks of the present frame is completed, the present frame image data of "L×M" pixels are reproduced and stored in the decoded image memory 13 and used for decoding processing in the next frame.

However, in the motion vector detection method which is used in the above-mentioned and conventional motion compensation interframe predictive coding apparatus, there is a level difference between the image data of the present frame and the previous frame when there is a fade-out in which one scene fades out or a fade-in which a scene appears slowly. Therefore, it is impossible to precisely detect the motion vector.

The motion vector represents a position displacement of the present frame block which has moved from a position in the previous frame. For example, the block position of the previous frame is obtained so that a square sum of the difference of each pixel in both blocks is the maximum value, and the difference between both blocks is obtained as the numerical value. Accordingly, when there is a luminance difference between both frames, the square sum of both the blocks at the same position becomes larger even though the image does not move, making possible to select an erroneous position where the square sum was too distant. When the image which is coded using such an extremely erroneous motion vector is reproduced by the conventional method, quality of the reproduced image decreases sharply.

SUMMARY OF THE INVENTION

An object of the present invention is to provide a method in which at least one image data element in two frames is corrected by eliminating a level difference between the image data in both the frames so as to detect a motion vector, thereby precisely performing the motion vector detection even when there is a fade-out or fade-in of the scene.

In order to achieve the above object, a motion vector detection method is provided for detecting the motion vector on the basis of two image information elements which are different in a time base, the motion vector is detected after at least one image data element of the two image data is corrected on the basis of the image data which respectively constitute the above-mentioned two image information.

By the motion vector detection method of the present invention, when the motion vector is detected from two image information sets which are discrete in time the motion vector is detected after at least one image data of the two image data data is corrected. It is therefore possible to obtain the precise motion vector even when there is a fade-out or fade-in, thereby preventing a deterioration in the decoded and reproduced image caused by an error of the motion vector.

DETAILED DESCRIPTION OF THE PREFERRED EMBODIMENT

There will now be described a preferred embodiment of a motion vector detection method according to the present invention in accordance with the attached drawing.

Figure 1:
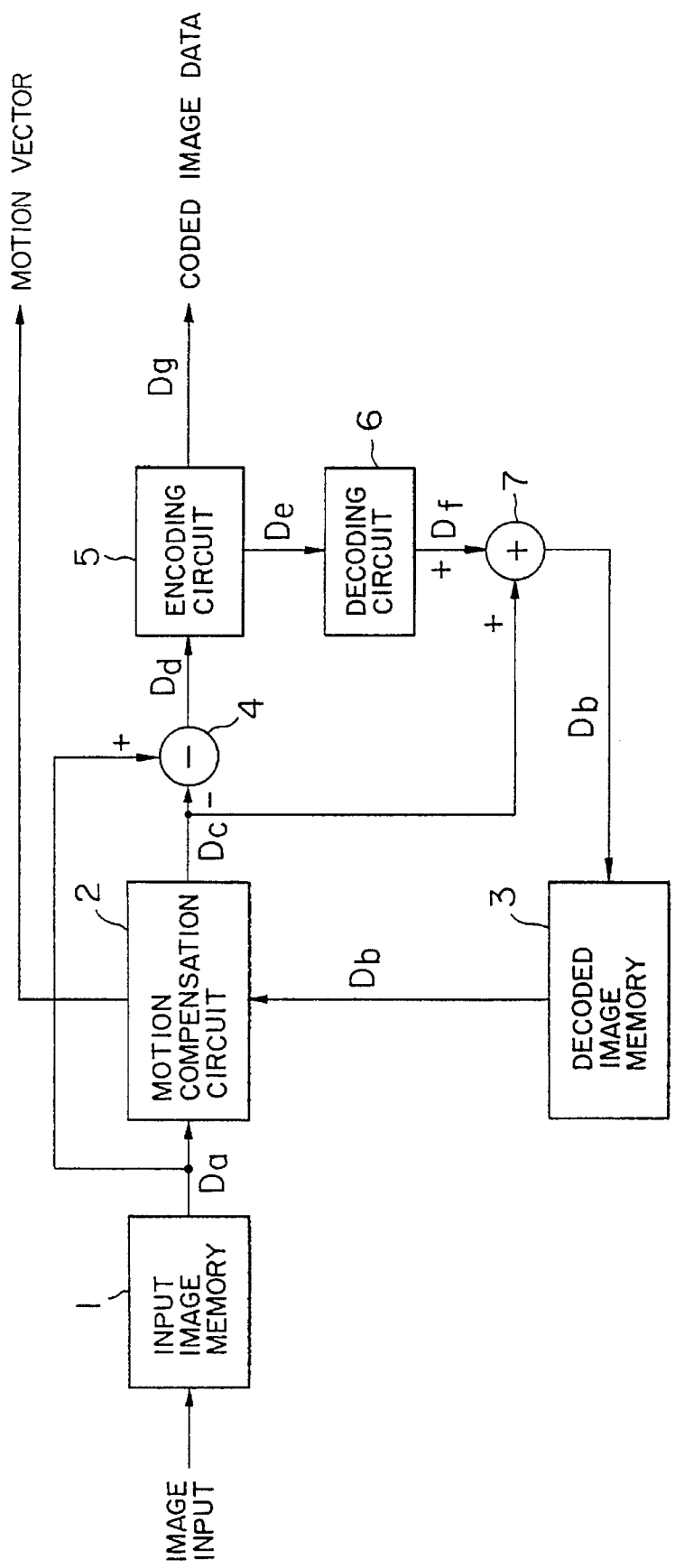
FIG. 1 is a block diagram schematically showing a motion compensation interframe predictive coding circuit according to the prior art.
Figure 2:
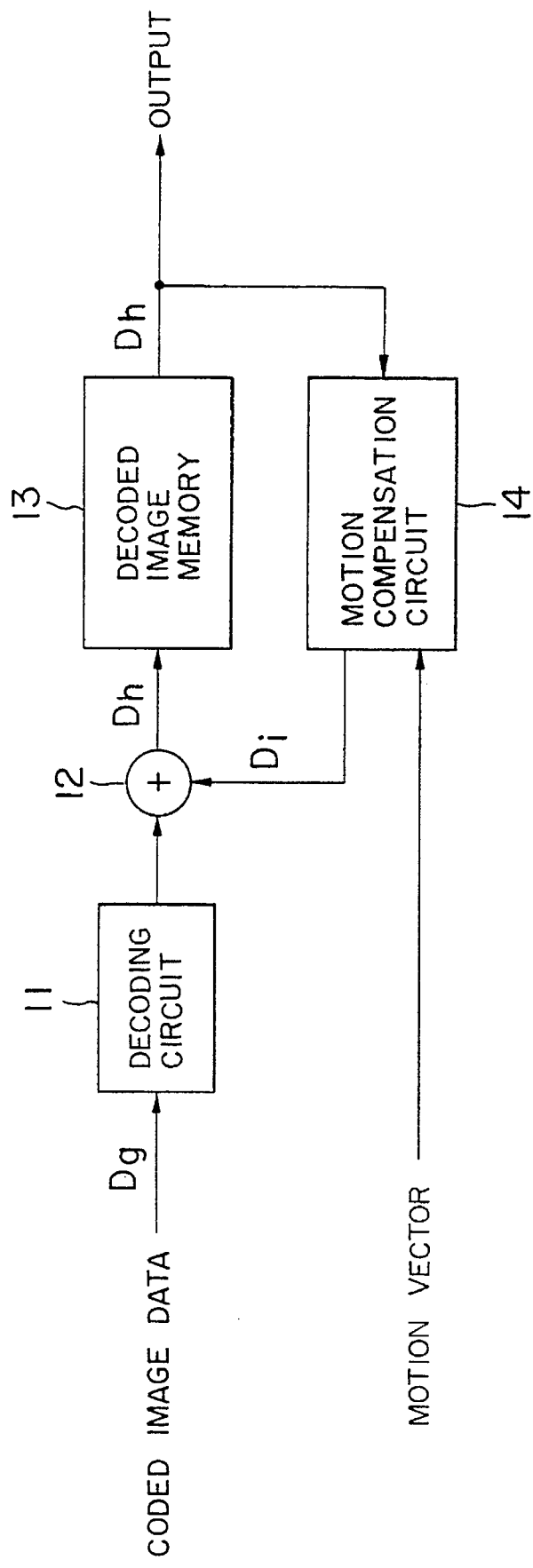
FIG. 2 is a block diagram schematically showing a decoding circuit corresponding to the motion compensation interframe predictive coding circuit according to the prior art.
Figure 3:
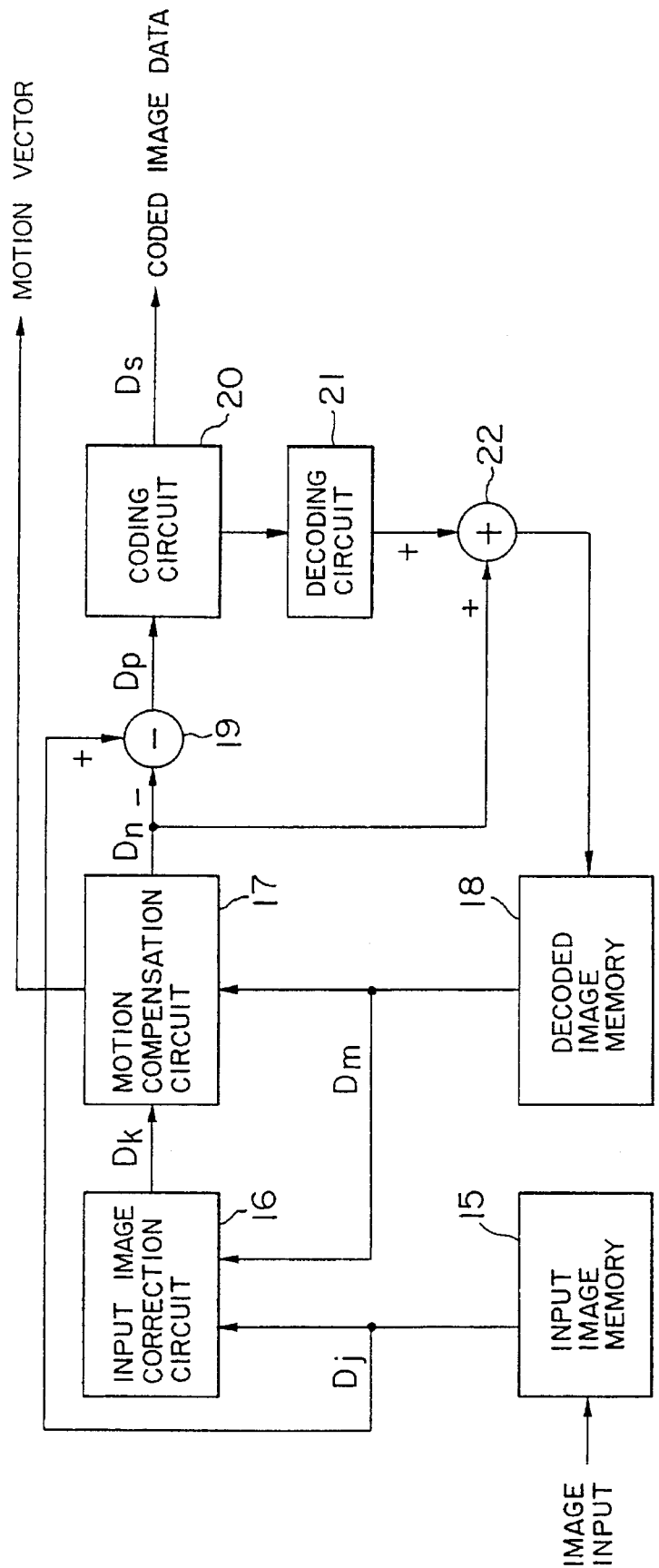
FIG. 3 is a block diagram schematically showing a motion compensation interframe predictive coding apparatus adopting a motion vector detection method according to an embodiment of the present invention.

FIG. 3 is a block diagram schematically showing a motion compensation interframe predictive coding apparatus adopting a motion vector detection method according to an embodiment of the present invention.

In FIG. 3, image information of the present frame is stored in an input image memory 15.

A decoded image memory 18 stores image information of a predetermined frame previous to the present frame, for example, image information of the previous frame which is decoded and reproduced from coded image data that is generated by coding image information in the previous frame. Here, each of the above-mentioned two image information constitutes one frame, for example, image data of "L×M" pixels.

An input image correction circuit 18 calculates a level ratio $C_A$ between the image data of the present frame in the memory 15 and the previous frame in the memory 18 by using the following equation (1) or (2):

$$C_A = \frac{\sum_{i=1}^{L \times M} (\text{data } D_j \text{ of present frame})_i}{\sum_{i=1}^{L \times M} (\text{data } D_m \text{ of previous frame})_i} \quad (1)$$

$$C_A = \exp\left\{ \frac{\sum_{i=1}^{L \times M} \ln\left(\frac{\text{data } D_j \text{ of present frame}}{\text{data } D_m \text{ of previous frame}}\right)_i}{L \times M} \right\} \quad (2)$$

In the above equations, (1) shows an equation for obtaining a ratio of sums of image data of all the pixels of the respective frames, and (2) shows an equation for obtaining a ratio based on ratios of image data of corresponding pixels at the same position in the respective frames.

Next, corrected input image data $D_k$ is generated by multiplying the input image data, namely, each data of all the pixels by a reciprocal $1/C_A$ of the calculated ratio $C_A$. This processing corrects a balanced level difference used in the motion vector detection with respect to the corrected image data of the present frame and the image data of the previous frame.

Even though the embodiment of FIG. 3 corrects the input image data, a method according to the present invention may correct decoded image data, in which the decoded image data of the entire pixel data are multiplied by the reciprocal $1/C_A$.

A motion compensation circuit 17 divides one frame into a plurality of blocks, each block comprising, for example, "8×8" pixels or "16×16" pixels, and detects as a motion vector, displacement between frames of the input image data $D_k$, corrected with respect to each block and the decoded image data $D_m$. Furthermore, predictive image data $D_n$ which are generated by motion compensation to the input image data $D_j$, are composed by applying the motion vector and the decoded image data $D_m$ to a subtracter 19 and an adder 22 as shown in FIG. 3.

The subtracter 19 subtracts the predictive image data $D_n$ from the input image $D_j$ to provide the predictive error data $D_p$ which are coded and quantized in an encoding circuit 20 to provide coded image data $D_s$. The coded image data $D_s$ are transmitted or recorded together with the motion vector which is previously obtained.

At the same time, the coded image data $D_q$ (same as the data $D_s$) are decoded by a decoding circuit 21 and added with the predictive image data $D_n$ in an adder 22 to reproduce the image data of the present frame (in a strict sense of the word, "the image data of the block after coding processing in the present frame"), for storage in the decoded image memory 18. Accordingly, when coding processing of all the blocks of the present frame is completed, the entire image data of the present frame are stored in the decoded image memory 18, and these data are used for the processing of the following frame.

In the motion vector detection method of this embodiment, since the balanced level difference of the image data between frames which are objective of the motion vector detection is previously corrected, and after that, the motion vector is detected from both of the image data thereof, it is possible to precisely detect the motion vector even at fading in/fading out frames, thereby preventing the deterioration of the reproduced image quality which occurs when decoding the coded image data that are coded by the erroneous motion vector.

Furthermore, in this embodiment, even though the object of the motion vector detection is configured by two images from consecutive frames, the present invention may apply to two images of the two fields construction, and to two images which are discontinuous in time base.

What is claimed:

1. An apparatus for detecting a motion vector included in image information, comprising:

an input image correction circuit which corrects input image data on the basis of input image information by using decoded image data which is processed prior to said input image data, in a manner such that said input image data are multiplied by the reciprocal of a value corresponding to a level ratio between said input image data and said decoded image data in order to correct an average level difference between corrected input image data and decoded image data;

a motion compensation circuit which detects a motion vector representing displacement between two data sets of input image data and which data sets are corrected by said input image correction circuit and said decoded image data, said motion compensation circuit composing predictive image data in which a motion is compensated corresponding to said input image data; and a coding/decoding circuit which codes/decodes an output of said motion compensation circuit and supplies said decoded image data as respective comparison components to said input image correction circuit and said motion compensation circuit.

2. An apparatus for detecting a motion vector included in image information, comprising:

an image correction circuit which corrects any one of a plurality of level values of input image data and decoded image data on the basis of input image information by using decoded image data which is processed prior to said input image data, wherein said input image data are multiplied by the reciprocal of a value corresponding to a level ratio between said input image data and said decoded image data;

a motion compensation circuit which detects a motion vector representing displacement between two data sets of input image data and which data sets are corrected by said input image correction circuit and said decoded image data, said motion compensation circuit composing predictive image data in which a motion is compensated corresponding to said input image data; and a coding/decoding circuit which codes/decodes an output of said motion compensation circuit and supplies said decoded image data as respective comparison components to said input image correction circuit and said motion compensation circuit.

* * * * *